(12) United States Patent
Albright et al.

(10) Patent No.: US 7,735,433 B1
(45) Date of Patent: Jun. 15, 2010

(54) LABORATORY WORKSTATION SYSTEM TABLE LEG AND DESIGN

(75) Inventors: Chip Albright, Ooltewah, TN (US);
Brian White, Muskegon, MI (US);
William Szabo, Blairstown, NJ (US)

(73) Assignee: Collegedale Casework, LLC, Collegedale, TN (US)

( * ) Notice: Subject to any disclaimer, the term of this patent is extended or adjusted under 35 U.S.C. 154(b) by 828 days.

(21) Appl. No.: 11/526,300

(22) Filed: Sep. 25, 2006

Related U.S. Application Data

(60) Provisional application No. 60/596,653, filed on Oct. 11, 2005.

(51) Int. Cl.
*A47B 13/00* (2006.01)
(52) U.S. Cl. ............. 108/153.1; 108/50.01; 108/158.11
(58) Field of Classification Search .............. 108/50.01, 108/50.02, 50.18, 190, 191, 192, 193, 180, 108/153.1, 152, 158.11; 312/223.1, 223.2, 312/223.3, 223.6; 403/230, 231, 208, 295
See application file for complete search history.

(56) References Cited

U.S. PATENT DOCUMENTS

| | | | | |
|---|---|---|---|---|
| 4,646,655 A | * | 3/1987 | Robolin ........................ 108/92 |
| 4,852,839 A | * | 8/1989 | Winter et al. .......... 248/220.42 |
| 4,941,412 A | * | 7/1990 | Engel .......................... 108/156 |
| 5,544,593 A | * | 8/1996 | Canfield et al. ............. 108/182 |
| D379,887 S | * | 6/1997 | Muller-Deisig et al. ...... D6/36.1 |
| 5,881,500 A | * | 3/1999 | Latino et al. .................. 52/36.1 |
| 6,220,180 B1 | * | 4/2001 | Janowitz ................... 108/50.01 |
| 6,267,064 B1 | * | 7/2001 | Ostertag et al. ........... 108/50.02 |
| 6,732,660 B2 | * | 5/2004 | Dame et al. ............... 108/50.01 |
| 6,805,060 B2 | * | 10/2004 | Nicoletti ................... 108/50.01 |
| 6,915,915 B2 | * | 7/2005 | Nakajima .................... 211/186 |
| 7,490,559 B2 | * | 2/2009 | Bentschneider .......... 108/50.01 |
| 2002/0011193 A1 | * | 1/2002 | Beck et al. ................ 108/50.01 |

OTHER PUBLICATIONS

DPR Planners Cornell Project Specification which provides for an all metal laboratory station configuration.

* cited by examiner

*Primary Examiner*—José V Chen
(74) *Attorney, Agent, or Firm*—Stephen J. Stark; Miller & Martin PLLC

(57) ABSTRACT

A laboratory station has rear legs and front legs which supports a table top. Utilities can be run through the rear legs and superior connections over prior art techniques are believe to be provided with preferred embodiments. Fillet nuts are believed to useful to provide increased stability over prior art designs for retaining the table top to the legs. Furthermore, a backsplash is useful in some embodiments where a single pair of rear legs are not utilized for back to back laboratory station constructions.

20 Claims, 12 Drawing Sheets

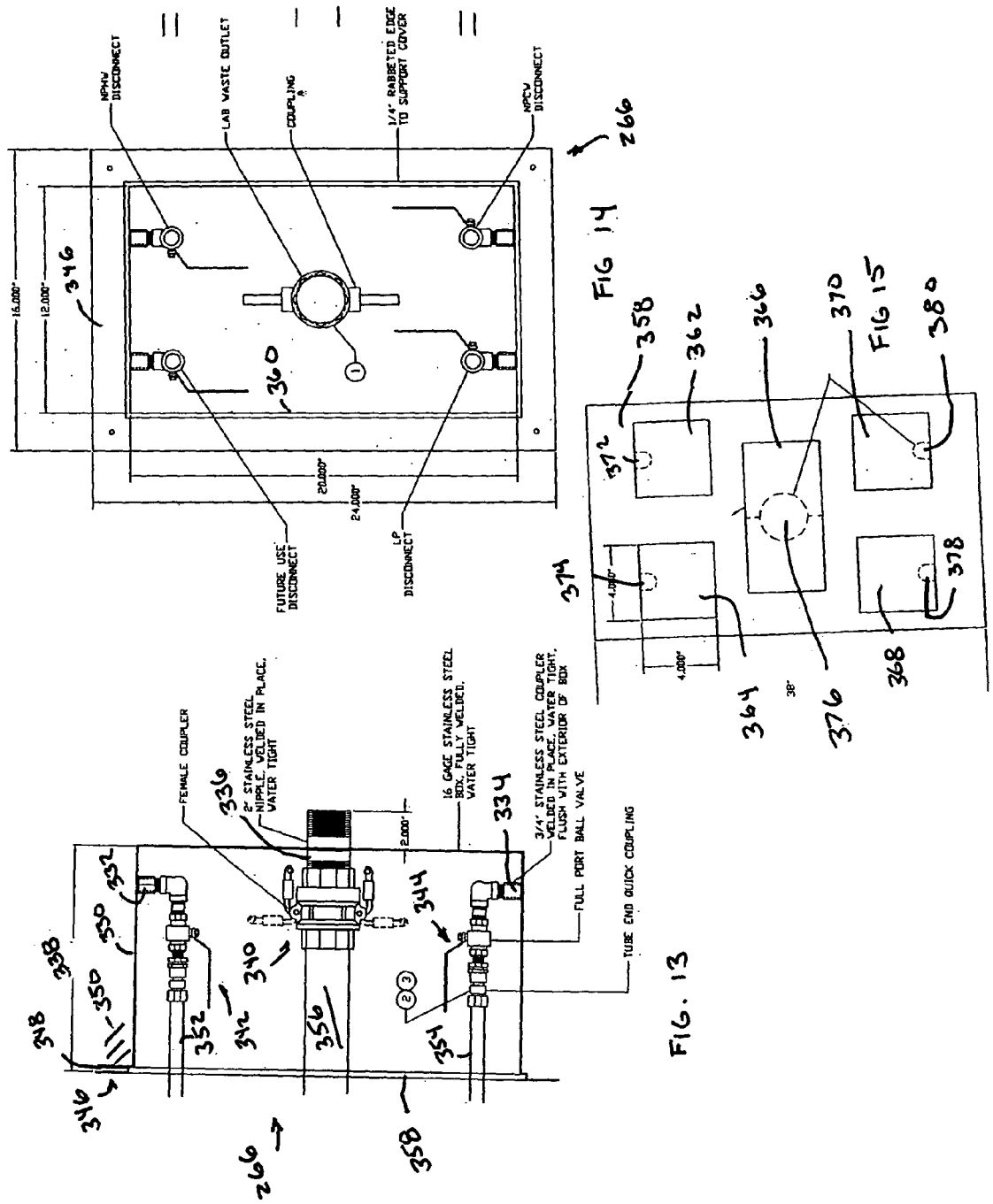

LABORATORY WORKSTATION SYSTEM TABLE LEG AND DESIGN

CLAIM OF PRIORITY

This application claims the benefit of U.S. Provisional Patent Application No. 60/596,653 filed Oct. 11, 2005.

FIELD OF THE INVENTION

The present invention relates to a laboratory table improvements and more particularly to a GPR style laboratory table configuration with a plurality of improvements over the requested specifications.

DESCRIPTION OF RELATED ART

GPR Planners Consultants, Inc., a large research laboratory design company, provided a request for bid for a laboratory table configuration for us at Cornell University's Life Sciences Technology Building. The drawings as well as specifications from this request are provided with the filing of this application. In this request, many of the details of how one would actually go about providing the structure are not addressed or specified. As one can see from looking to the drawings and request from the Cornell group package, there is no significant detail about how a manufacturer could actually build the table independent of welding up the requested construction in accordance with the drawings.

SUMMARY OF THE INVENTION

While a functional table can be provided in that manner, the applicant has, through their engineering and development efforts, discovered that improvements to the basic GPR™ design are possible and needs for an improved laboratory table construction is believed to be desirable over this prior art laboratory table construction.

It is an object of the present invention to provide an improved laboratory table configuration having improved stability.

It is another object of the present invention to provide an improved table construction which provides an improved modularity or flexibility.

It is another object of the present invention to provide an improved laboratory table configuration that provides what is believed to be a stronger support for a work surface than available with traditionally formed tables.

It is another object of the present invention to provide a laboratory table which is easily adaptable for single sided or two sided use applications.

It is another object of the present invention to provide a laboratory table which provides an ability to elevationally adjust utility connections.

It is another object of the present invention to provide an improved front retaining rod for use in seismic location applications.

It is another object of the present invention to provide an improved floor utility service box for at least some installations.

It is another object of the present invention to provide an improved overhead service column configuration for at least some installations.

It is another object of the present invention to provide an improved rear leg construction.

It is another object of the present invention to provide an improved shelving construction.

It is another object of the present invention to provide improved internal utility construction.

It is another object of the present invention to provide an ability to utilize shared rear legs with adjacent tables.

It is another object of the present invention to provide what is believed to be a unique storage capability and configuration over prior art designs.

Accordingly, in a presently preferred embodiments of the present invention, a fillet nut having an arcuate surface which cooperates with an internal surface of curved leg structure is retained by tabs and cooperates with a connection member such as a bolt to distribute load force from the connection member across at least a portion of the curved surface of the fillet. This fillet nut construction may be utilized for connection to a frame of both front end rear leg connections. Preferably multiple bolts are may be utilized with a single fillet nut application. This is believed to provide additional strength over prior art welding or bolt and traditional nut constructions.

An optional backsplash is provided for use in some embodiments when using a laboratory table from a single direction. This backsplash is believed to be unique over prior art backsplashes in that it includes a table surface extender portion.

A one-piece tabletop frame portion allows a reduction of welding twenty-seven parts to nine parts in the presently preferred embodiment which is believed to increase strength as well as decrease complexity of forming the frame.

By providing internal channels within rear legs which are accessible from internal sides of the table, the panels can be sized to fit and accommodate different utility configurations such as gas, water, power, etc., at different elevations in different specifications as requested by the user in a preferred embodiment. By providing pre-assembled utility fixtures which connect to an upper receptacle which cooperate with laboratory plumbing such as with flexible conduits or otherwise, a remarkable reduction in installation costs of the table as compared to prior art configurations such as those provided as wooden casework in the past is believed to be attainable.

By providing internal access on the rear legs in a preferred embodiment, when installed in multiple table configurations with adjacent rear legs against other rear legs, the operator can still have access to remove the plumbing without a need to move tables relative to one another. This is believed to be a huge improvement over the GPR specifications which anticipate using obround tube stock for the rear legs.

Utility connections can be moved or changed relatively easily and placed at desired locations in the preferred embodiment. In the prior art design new leg assemblies would most likely be required since holes are drilled in obround tube stock and certain portions are anticipated to be welded in place.

Various height assemblies of the shelving units can be provided to accommodate the raising and lowering of at least one electrical utility bar which in the preferred embodiment substantially spans the width of the table.

A removable front retaining rod is required in many applications. An improved design is a feature of at least some embodiments and has been constructed which is believed to be an improvement over prior art tapping of rod stock and screwing through bores in shelving units.

An improved floor box has been constructed which may allow for the provision of drainage from sinks as well as possibly provision of water supplies for a sink and/or other utilities. The floor box also preferably provides a waterproof barrier when installed in concrete and provides an easy way to access utility connections while maintaining floor integrity.

A service column is also anticipated to be an optional feature with the preferred embodiment which provides an ability to pre-plumb services in an overhead portion before installation of a dropped ceiling. By pre-plumbing utility services into a service column before installation of a dropped ceiling, it is anticipated that a cost savings of approximately 15% can be experienced due to the mechanical, electrical and plumbing contractors not having a need to work through a dropped ceiling to make appropriate connections after a ceiling is installed.

By forming up the rear legs instead of utilizing an off the shelf obround tubing, the applicant discovered many advantages in some embodiments. Some advantages include an ability to precisely hold a fillet nut in a desired location in the rear leg which can assist in precise positioning of the frame relative to the rear leg in order to assist in providing an extremely sturdy connection. Additionally, an interior passage in the rear leg can be maintained for utilities whether electrical or other fluids in an easily accessible manner.

Improved shelving has been found advantageous in that preferred embodiments prevents a need to machine cut outs at the back of planar shelving panels. The preferred construction is believed to save a significant amount of time while providing for flexible adjustment of positioning utilities relative to the rear legs while accounting for the curvature of the obround shaped supports.

Shared leg construction options can be provided in some embodiments where rear legs are shared by adjacent table constructions in a side-by-side manner.

Finally, the table configuration of the applicants is believed to be well suited for storage. The frame is easily separable from the legs for storage. A cabinet or series of cabinets can store frames, legs, the table tops, shelving, plumbing components, electrical components in a convenient arrangement so that when a laboratory station is in need of reconfiguring or a percentage more than anticipated requirements or ordered additional components can be easily stored out of the way when not in use.

When the table is constructed, it is believed to conform to meet the requirements of the GPR table specification in an improved manner.

BRIEF DESCRIPTION OF THE DRAWINGS

The particular features and advantages of the invention as well as other objects will become apparent from the following description taken in connection with the accompanying drawings in which:

FIG. 13 shows a side cutaway view of the floor box shown in FIG. 10;

FIG. 14 shows a top plan view of the floor box shown in FIGS. 10 and 13 with the cover removed;

FIG. 15 shows a top plan view of a cover for use with the floor box of FIG. 10 showing outlines of cutouts utilized in the presently preferred embodiment of the present invention;

DETAILED DESCRIPTION OF THE DRAWINGS

Figure 1:
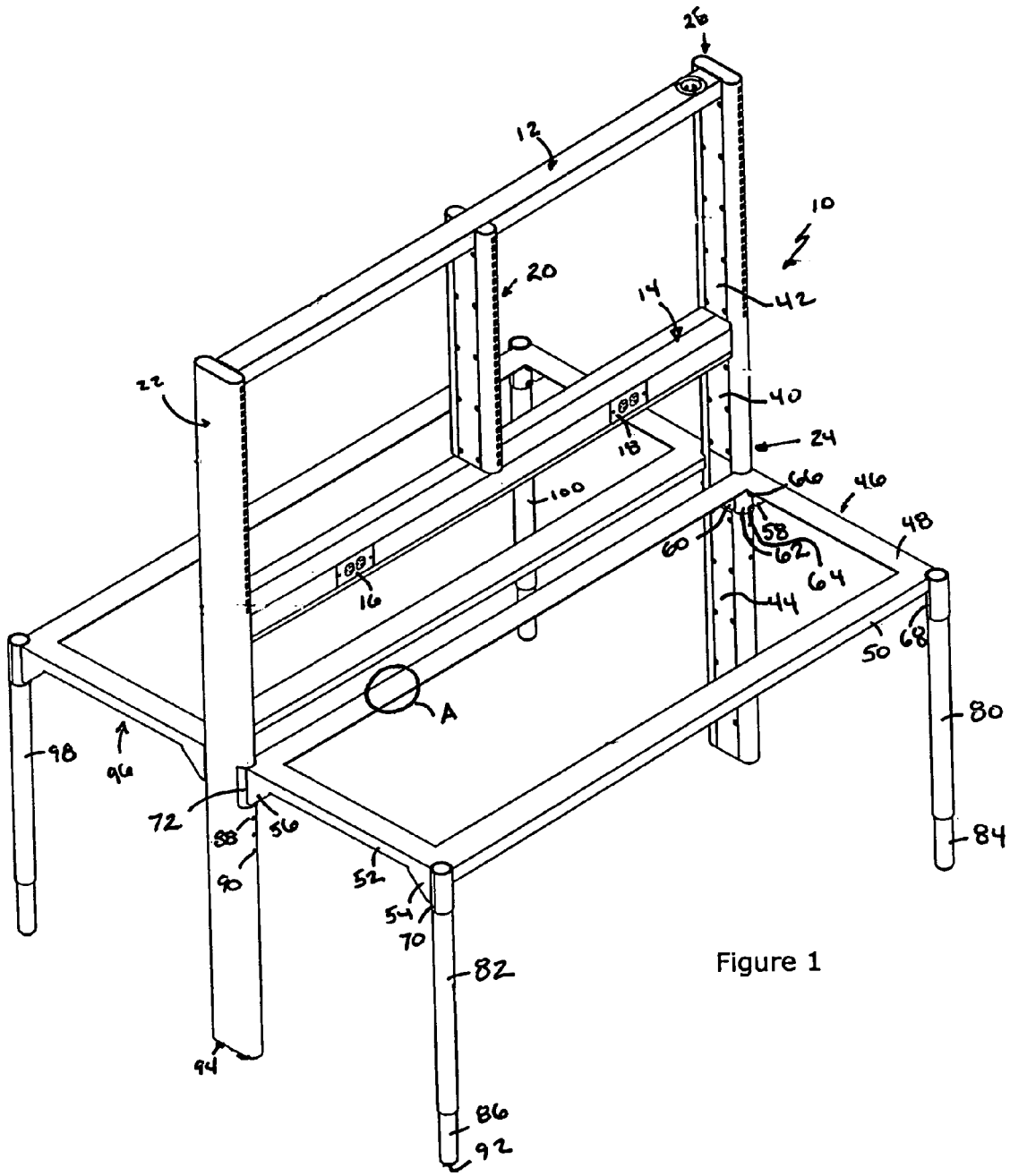
FIG. 1 is a top elevational view of a presently preferred embodiment of the present invention with a top surfaces and shelving removed.

FIG. 1 shows a presently preferred embodiment of the present invention in the form of a station 10 which is illustrated in the preferred embodiment having a first utility channel 12 and a second utility channel 14. The first utility channels 12 and 14 are illustrated as being parallel, but this need not be the situation in all embodiments. The second utility channel 14 preferably has at least one set of outlets 16 and possibly two or more sets of outlets 16,18 as illustrated (opposing outlets opposite outlets 16,18 are obscured from view). When utilizing applicants' station 10, current can be provided on more than one circuit with multiple breakers so that if a circuit breaker to one outlet such as to 16 or 18 are tripped, the other outlets such as 16 or 18 could continue to provide electricity. In fact, four or more circuits have been provided in the preferred embodiment to various outlets 16,18.

Separating the first and second utility channels 12 and 14 is a center upright 20 which will be described in further detail below. The first and second utility channels 12 and 14 are also connected to first and second rear legs 22,24. First rear leg 22 is preferably an electrically powered leg that has conductors which connect the first utility channel 12 to the second utility channel 14 as well as providing at least another outlet (obscured from view) that can provide power to various appliances and equipment as can be utilized in various situations.

Figure 5:
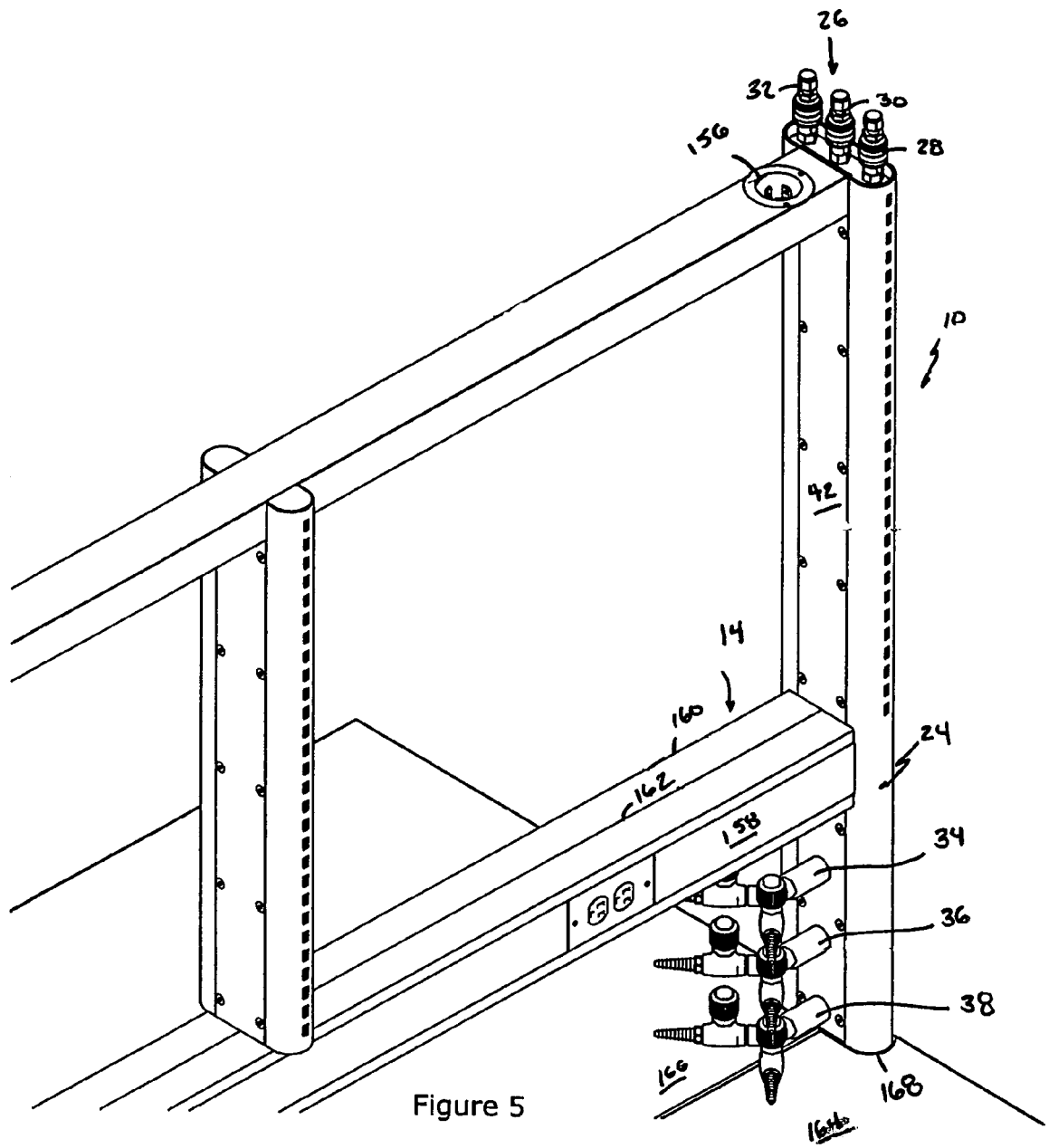
FIG. 5 is a detailed view of a portion of FIG. 1 showing a six utility fixture station connection provided along with respective inputs.
Figure 16:
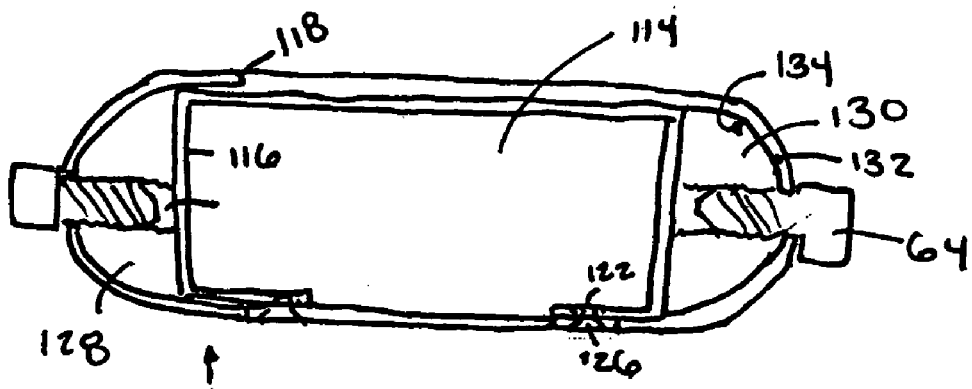
FIG. 16 shows a cross-sectional view of a rear leg.

Second rear leg 24 is preferably utilized as a plumbed leg in that it may provide fluids from top 26 as may be better seen as reference to FIG. 5 at one or more quick disconnects 28,30,32 illustrated. The respective quick disconnects 28,30,32 can be keyed for a particular fluid so that water could not be provided to a gas line or gas to a water line, etc. Of course, gas, water, air and other fluids may, or may not, be utilized in all embodiments but these three are provided to show the capability of the station 10 in a preferred embodiment. Of course, it is possible that other fluids not currently anticipated by the client could be plumbed in a similar manner. It is anticipated that from the quick disconnects 28,30,32 to the fixtures 34,36, 38 can be provided as a component from the manufacturer. For a particular application the customer could request a particular fixture configuration and the appropriate equipment could be provided with the second rear leg 24. This provides a great advantage to the customer in that quick and easy assembly of the second leg 24 can be provided on site or from the factory with little, if any, skilled utility contractor assistance. Furthermore, if the needs of the customer change over time such as a need for another particular utility, the customer can request the particular plumbing configuration from the manufacturer and a replacement part can be provided without a need for any trained trade to replumb any portion of the station 10. A maintenance man could merely swap out any of the existing plumbing fixtures 34,36,38 and the conduits connected to the quick disconnects 28,30,32 and a replacement made on location as will be explained in further detail below. A cross-section of second rear leg 24 is shown in FIG. 16 and will be explained in detail below which is useful. FIG. 1 does not show the fixtures 34,36,38 of the presently preferred embodiment but instead shows panel 40 as one of a plurality of panels 40,42,44 without the fixtures before their installation. This could be an option for some embodiments to forego plumbing.

Work surface frame 46 is shown in FIG. 1 connected to first and second rear legs 22,24. The upper and side surfaces are preferably constructed of a single piece of 11 gauge steel but could be constructed of other materials in other embodiments. By forming it of one piece, the top 48, the front 50 and the sides 52 are bent from one piece. Furthermore, gussets 54,56 and 58 are preferable integral to this construction as well. This is believed to provide increased strength to the overall construction of the frame 46. Bottom portions of the frame 48 which are obscured from view are preferably completed with bent portions of steel to provide a hat channel and box type construction which is believed to add to the overall stability and strength of the frame 42. Furthermore, a back stop preferably extends along a back as shown continuous with at least a portion of gusset 60 across the back at a lower level than front 50 so that a cabinet can be slid underneath the front 50 while still contacting back stop at the rear of the frame 46. These features can be better understood with respect to FIGS. 17 and 18 which are discussed below.

Figure 17:
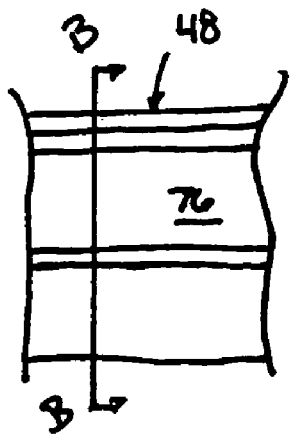
FIG. 17 shows a front view of a back portion of the frame.
Figure 18:
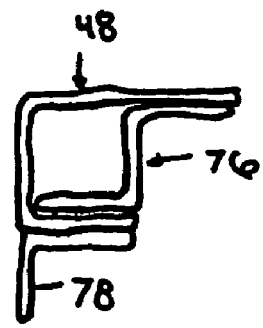
FIG. 18 shows a cross-sectional view taken along the line B-B in FIG. 17.

Gussets 58 and 60 meet at a saddle 62 through which one or more screws 64,66 are utilized to connect to the rear leg 24 as will be explained in further detail with reference to FIGS. 4 and 16. Similar construction can be provided with saddles 68,70 and 72. By constructing the frame 46 in this manner, only nine pieces are utilized, whereas in prior construction over twenty-seven pieces were utilized to construct competing products. A detailed area A is provided in FIGS. 17 and 18 showing hat channel 76, connected to frame top 48 which is believed to provide additional structural support and stability. Back stop 78 is illustrated which would stop a casework or cabinet from being slid past the rear of the legs 22, 24 while still allowing it to pass under the front 50 of the frame 46. Of course, other embodiments may have other configurations, but this particular design has been found to provide significant strength and stability.

Figure 6:
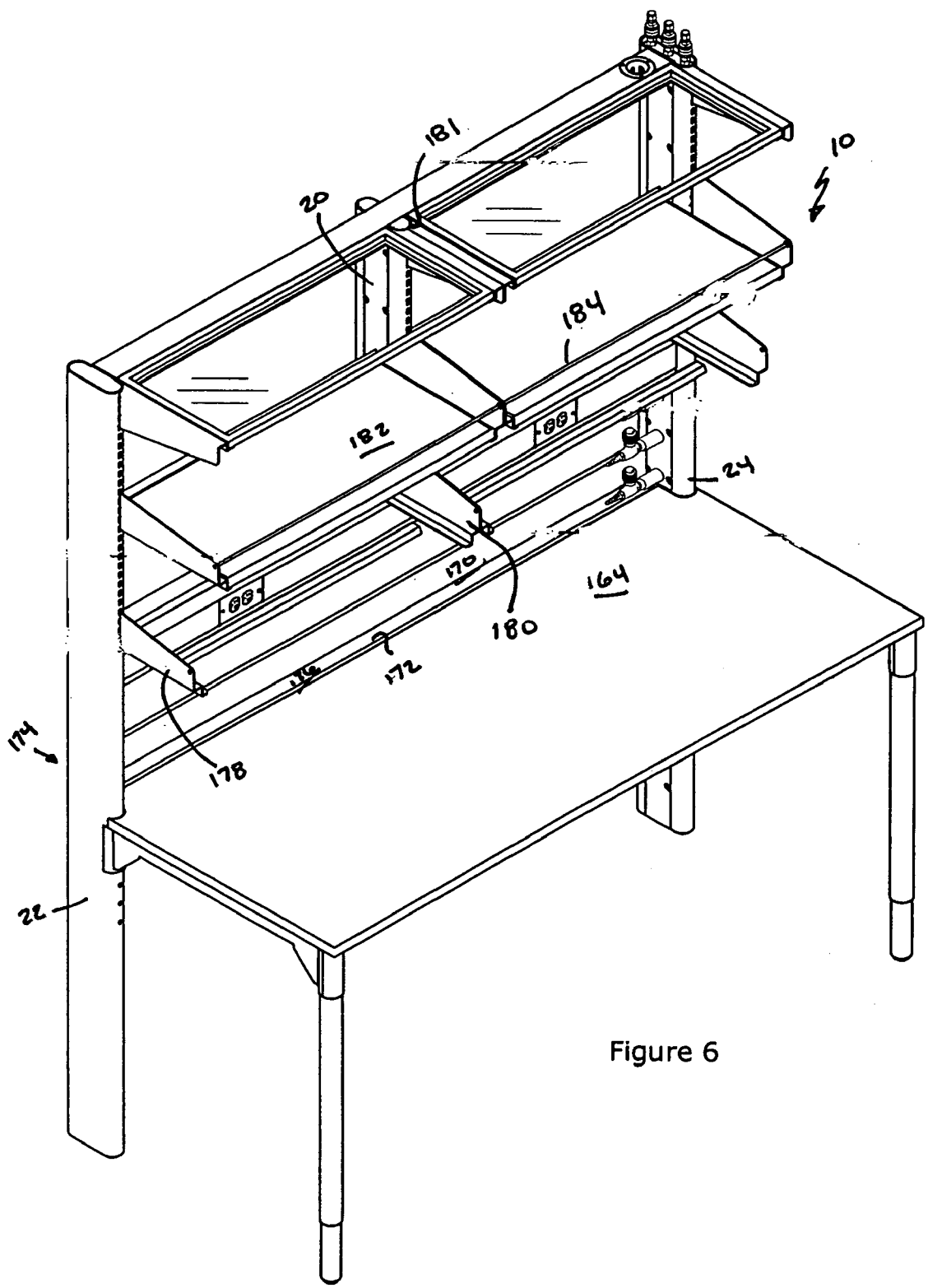
FIG. 6 shows a station of FIG. 1 in a single sided embodiment with some shelving installed (and some portions removed for purposes of clarity) as well as the table top and a backsplash installed in accordance with an alternatively preferred embodiment which is utilized in a single access position as opposed to the back-to-back access configuration shown in FIG. 1.

Referring back to FIG. 1, front legs 80, 82 are preferably hollow cylindrical members through which telescoping extensions 84,86 are connected with screws extending through bores and legs 80,82. In order to accommodate height adjustment, a plurality of bores 88, 90, etc., are provided where legs 22, 24 which can receive bolts 64, 66 therethrough so that the frame 46 can be set at a desired height especially when cooperating the telescoping members 84,86 are adjusted on the front legs 82, if so provided. Leveling feet 92,94 are preferably provided with the front feet 80, 82 as well as the rear legs 22,24 which would be known by one with ordinary skill in the art. In FIG. 1, a second frame 96, and front feet 98 and 100 are utilized to provide a station 10 that is both useable from the front as well as from the back. FIG. 6 shows an alternate embodiment showing anticipated single sided use.

Figure 2:
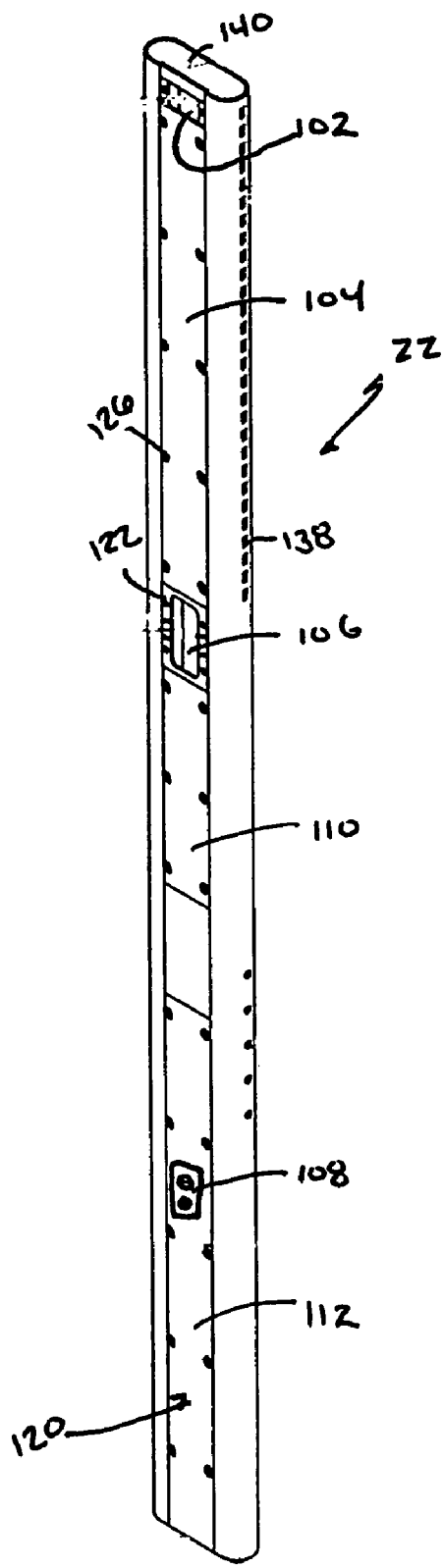
FIG. 2 is a top perspective view of one of the rear legs removed from the structure shown in FIG. 1.

FIG. 2 shows a detail of a first rear leg 22 which connects to both first utility channel 12, second utility channel 14. First rear leg 22 provides an access 102 for passing electrical conduit behind plate 104 and through access 106 into second utility channel 14. Additional outlets 16, 18, 108 can be provided based on particular design considerations. Panels 110 and 112 are useful to define an interior portion which can house cables such as in a similar manner as is shown in FIG. 16. Furthermore, with the first and second utility channels 12 and 14 removed one can see how the channels 12,14 as well as panels 40,42,44 connect to the legs 22,24 in that interior channel 114 is partially defined by a C shaped interior channel member 116 which extends past outer member 118 on the internal side 120 and has bores 122 which receive screws 126 at appropriate spacing (See FIGS. 2 and 16). In fact, in the presently preferred embodiment of the present invention, there is spacing and location approximately every three inches so that the particular height of the second utility channel 14 could be set at various heights as desired by the user especially when provided with an appropriately sized center support 20 and panels 110,104,112.

Continuing with reference to FIG. 16, fillet nuts 128,130 are illustrated with respect to connections for receiving bolts 64, 66 therethrough. The fillet nut 130 as illustrated has an exterior surface 132 which cooperates with an interior surface 134 of the outer member 118 to assist in distributing load thereabout when the bolt 64 connects to the fillet nut 130 as shown. This distribution of load is believed to significantly add to the stability of the connection which replaces the prior art technique which is simply connecting the screw 64 to a nut to provide point loads of the nut where it meets the interior 134 of the outer member 118 which was in the prior art was an obround tube. Significantly higher strength is believed to be attainable by the applicant especially when the fillet nut 130 has a significant enough length to span at least two and preferably all of the bores 88,90 as shown in relationship to FIG. 4.

Figure 3:
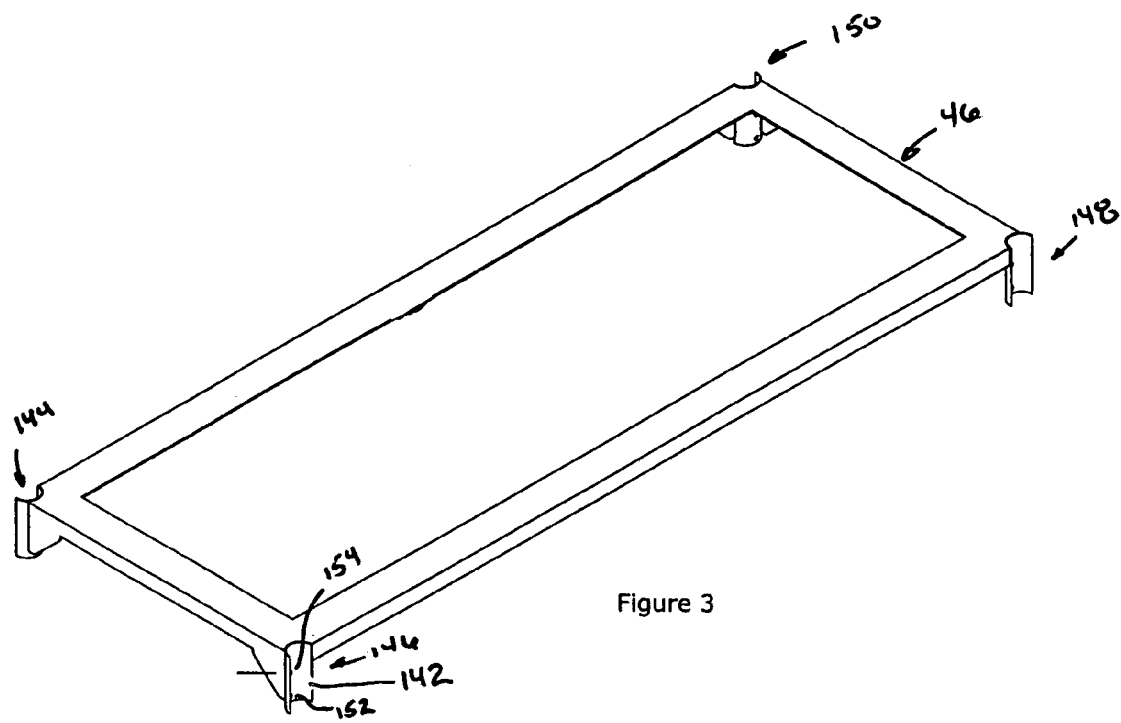
FIG. 3 is a top perspective view of a frame removed from the structure shown in FIG. 1.

FIG. 3 shows a detailed view of a frame 46 removed from the remainder of the station 10. FIG. 3 taken in conjunction with FIGS. 17 and 18 are useful to understand what is believed to be a preferred construction of a frame 46 over a prior art design of welding one by two inch tubing together, then welding on separate gussets, and other members which in the prior art took twenty-seven pieces. This design illustrated has taken the applicant nine pieces and is believed to be provide significant strength for most applications.

Figure 4:
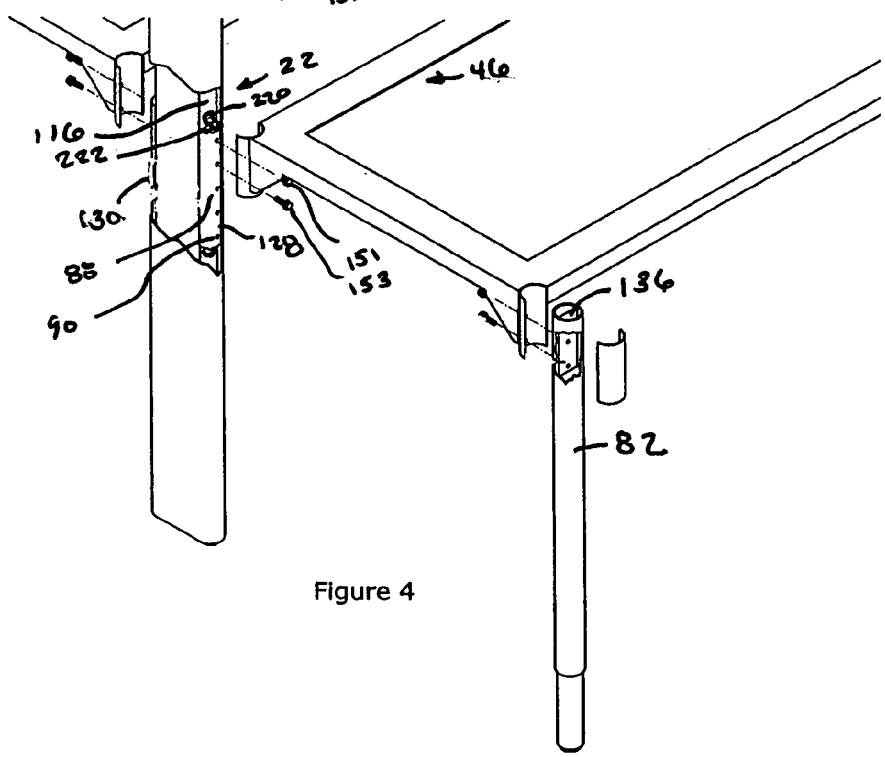
FIG. 4 is an exploded view of the frame connected to the rear leg and the front leg with at least some of the internal portions shown for the rear leg and front leg.

FIG. 4 shows a connection of the frame 46 to the first rear leg 22 and a first front leg 82 utilizing fillet'nuts 128 and 136.

Fillet nut 136 has been located in the front leg 82. Fillet nut 136 has a somewhat similar construction as fillet nut 128 but may not be need the ability to provide for adjustable heights as is provided by Fillet nut 128 and 130 in the preferred embodiment but could in other embodiments.

Referring back to FIG. 2, cutouts 138 are useful for connection of shelves as will be explained below. Connection plate 140 or cap is useful in first leg to prevent unwanted access into the interior 114 of the first leg 22. Conduits internal to the first rear leg 22 as well as first and second utility channels 12 and 14 may be connected with Molex™ connectors or otherwise. Molex™ connectors have been found to be particularly attractive options to provide easy connection points which do not require a certified electrician for connection. Furthermore, sufficient lengths of conduits are preferably provided so that outlets such as 108 can be placed in various locations as might be utilized by a particular user without a need for providing additional equipment or wiring at a later date.

Frame 46 as shown in FIG. 3 has saddles 142 welded at corners 144,146,148 and 150. The saddles 142 are provided with bores 152,154 which receive bolts 151,153 therethrough for connection to the legs as will be understood by one of ordinary skill in the art to the fillet nuts 128,136 in the preferred embodiment as described above.

In addition to the electrical connections as described above with reference to in FIGS. 2 and 5, electrical plug 156 is illustrated which receives power as will be described in further detail with respect to FIG. 10 which may be connected by someone other than a licensed electrician due to the plug and socket type connection. This could significantly decrease installation costs of the station 10. Lower utility channels 14 is illustrated as having a front 158 as well as back 160 which preferably could be symmetrical about axis 162 or otherwise constructed in other embodiments. FIG. 5 shows table tops 164 and 166 connected to the station 10. It is worth observing the cutout 166 is made at a rear portion of the table tops 164,166 so that the table tops 164,166 fit against the rear legs 22,24 and form at least a relatively continuous planar surface.

FIG. 6 shows a station 10 as the figure in FIG. 1 except that it is not a double sided configuration. Specifically, a second frame 96 is not provided nor are a second set of front legs 98,100. In this embodiment, splashguard 170 is provided which is believed to be different than traditional splashguards in that it has an extension 172 which is potentially the same height as table top 164 or slightly higher. Extension 172 provides table top extension so that the back splash 170 extends continuous with rear 174 of first and second 22, 24 rear legs for advantageous positioning. The applicant is not aware of splashguards being formed with an L-shape to include an upper surface 176 which is continuous if not slightly higher than table top 164 when installed.

Shelves are illustrated with some partially installed in FIG. 6. They include shelf brackets 178 and 180 which cooperate with planar shelves such as shelf span 182 which is preferably rectangular in shape. This is done by having offset brackets 178,180 which have cutouts 181 which conform to the exterior shape of central upright 20 as well as a respective first and second rear legs 22,24 in a somewhat similar manner as table top cutout 168 does. These offset shelf brackets 178, 180 are believed to be an advance over the prior art construction and allow for more efficiently making the shelf spans 182 as well as the ability to place units adjacent to one another in an efficient manner (i.e., shelf spans 182 may be made without cutouts).

Front retaining rod 184 is preferably provided in a somewhat different manner as has been done in the prior art. In the prior art, end rods 184 would have been drilled and then retained with screws therethrough to each of the shelf brackets 178 and 180. In the preferred embodiment, due to precision alignment, the shelf brackets 178, 180 may be predrilled with bores 186 and the retaining rod 184 may be cut to a precise length. A notch may then be cut at a location just before where the rod 184 would enter into the bore 186 and a retaining ring 188 placed thereon. Rod 184 can then be slightly bent and placed into location wherein it springs back into shape and is retained in a desired position. This construction is believed to be novel over prior art designs. It also provides a rod 184 which is relatively easy for a user to remove if they so desire, but may be required in some applications for seismic protection.

Figure 7:
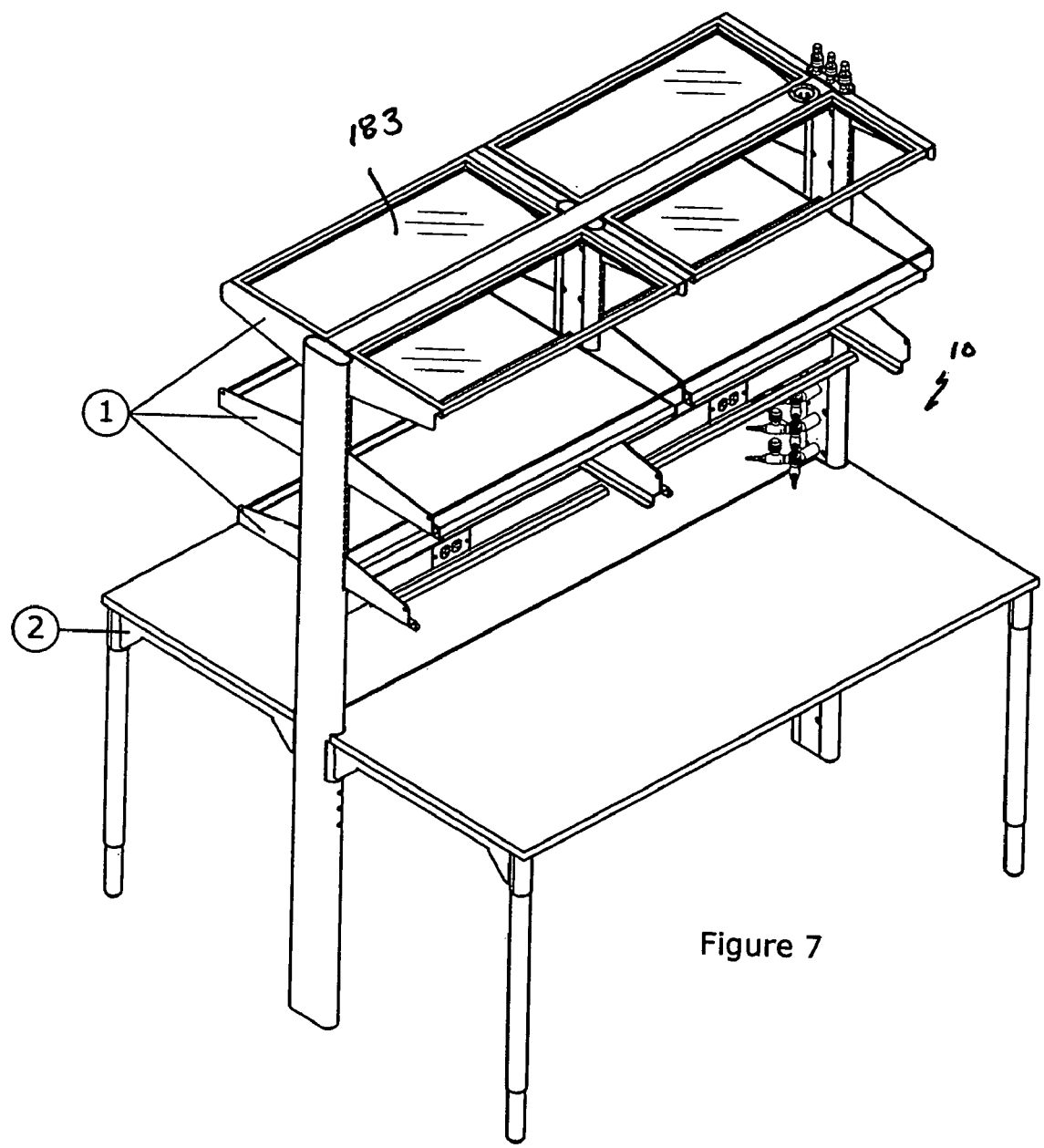
FIG. 7 shows a configuration of FIG. 1 with rear lower shelves removed for clarity.

FIG. 7 shows the double-sided embodiment as shown in FIG. 1 with fixtures installed and lower shelf spans removed for clarity. Glass spans 183 may assist in illuminating work areas.

Figure 8:
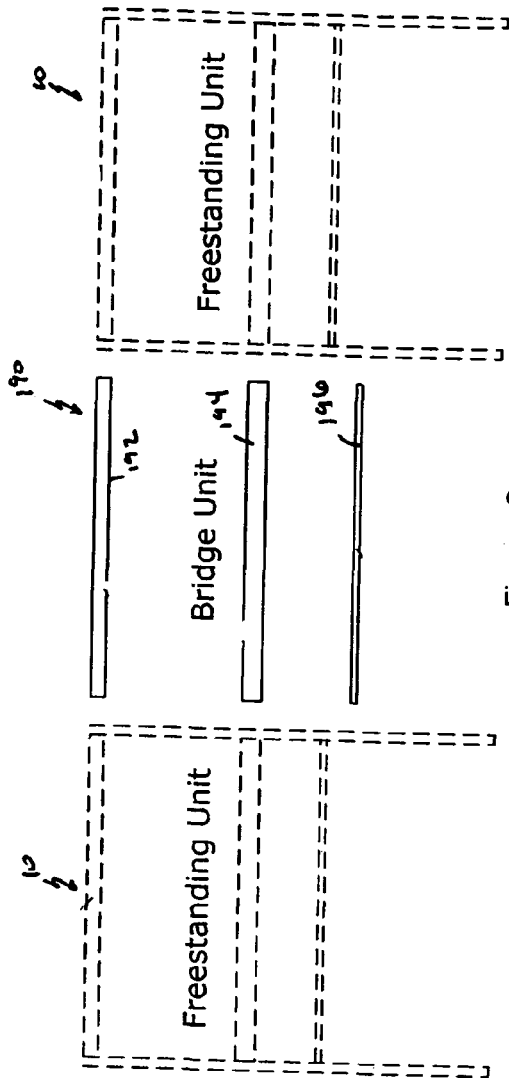
FIG. 8 shows an alternatively preferred embodiment where a bridge unit is utilized in between free standing units such as those shown in FIGS. 1 and 7.

FIG. 8 shows schematically two stations 10 such as those shown in FIG. 1 connected by a bridge unit 190 which could include an upper utility channel 192, a second utility channel 194 and a table top 196. The table top 196 could also be connected to a frame with its own set of front legs, but the back legs are envisioned to be shared from the freestanding unit stations 10 on either side of the bridge unit 190. Specifically, it is anticipated rear saddles could be connected lower than the saddles illustrated on the frame in FIG. 3 and could therefore accommodate the construction. A similar type construction could be provided for the outer units 198,200 such as left handed or right handed outer units in FIG. 9. Of course, in other embodiments rear legs of adjacent units may not be shared.

Figure 9:
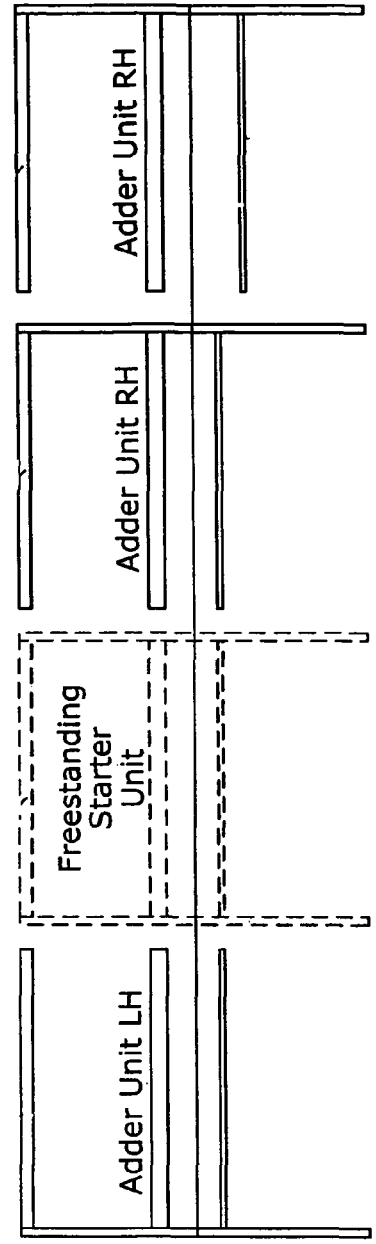
FIG. 9 is a alternatively preferred embodiment showing the use of add on units to the free standing units shown in FIGS. 1 and 7.
Figure 19:
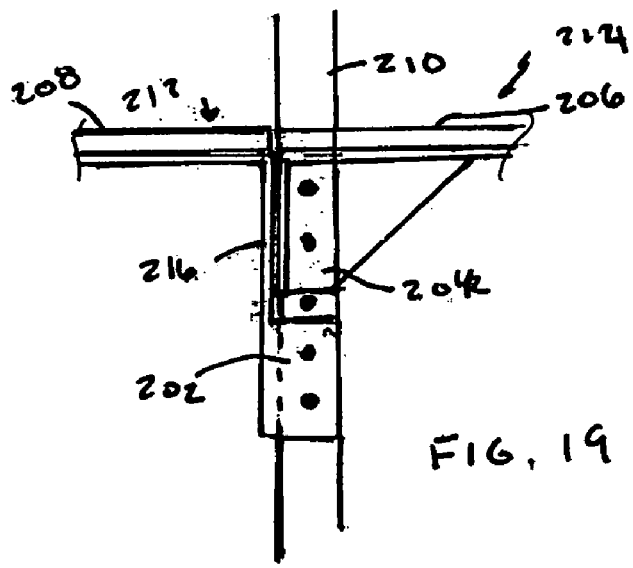
FIG. 19 shows a front view of bridge and add-on style saddle connections as configured for use with the configurations of FIGS. 8 and 9.

FIG. 19 shows the construction contemplated in FIGS. 8 and 9 with adjacent unit connections utilizing a single rear leg. Specifically, rear leg portion 210 is illustrated with first saddle 202 from either add-on unit or bridge unit 212 located below saddle 204 of table 214 of the freestanding unit which can include the rear leg 210. Extender 216 extends the frame of the add-on unit 212 on a bridge unit in the respective embodiment so that the tabletop 208 is coplanar with tabletop 206. Saddles 202 and 204 are shown one on top of the other and spaced apart although they could connect or not connect depending on the construction of the saddles 202,204. In this construction, it is anticipated that adjacent tables will still have separate front legs but other systems connecting to shared front legs may be implemented. Front legs 80,82 may be provided so that fillet nut 136 could accommodate a lower saddle from add on or bridge units as well as so that no additional legs would be necessary with adjacent units, even at the front. Nevertheless, side by side leg embodiments as shown in FIG. 10 are still contemplated for at least some embodiments.

The ability to provide stable support over the prior art design is believed to be at least one of the novel features of this design of the station 10. Specifically, the fillet nuts 128,130 and 136 as illustrated in FIGS. 4 and 16 are believed to advantageously distribute load relative to the respective legs 22,24,80,82. As illustrated, since the rear legs are obround and the front legs are circular the interior surfaces 134, etc. of the legs are round or at least curved. The fillet nuts 128,130, 136 preferably span an arc of at least 45° and are shown spanning an arc of up to about 90° to provide a contacting surface 132 to cooperate with the interior surface 134 of the respective legs. Furthermore, as explained above, the fillet nuts 128,130 and 136 preferably have an elevation to accommodate a plurality of bolts 64, etc., therethrough for an even stronger connection that extents not only laterally as shown as FIG. 16 but also vertically as well. This is believed to provide a more stable construction in prior art designs. By utilizing this construction in at least some embodiments, table stations 10 which may be subjected to objectionable movement, i.e., vibration that could interfere with work being performed, may be sufficiently stable.

A single point of contact is performed in the prior art at a bolt and nut connect which is believed to be advantageously overcome by the applicant's construction at least for some embodiments. While welding tubing and providing bolt with a single nut for an attachment for prior art design of connecting legs was performed, the applicant's design is believed to provide a flexibility to be able to easily remove the frame 46 from the legs 22,24 for height adjustment or storage while providing exceptional strength. The fillet nuts 128,130,136 are machined to accommodate the bolts 64. Furthermore, since the fillet nuts 128,130,136 have a significantly deeper length (or thread depth) than prior art nuts which are typically of the ordinary depth of about a head of a bolt 64, there is significantly less risk of stripping a fillet nut 128,130,136 than stripping a prior art nut.

The frame 46 being made of substantially one piece for the top surfaces as well as the sides, front and back, and even a portion of the bottom as well as the gussets has been found to be desirable. The respective saddles 142 can be welded to the frame 46 as shown. By utilizing the saddle construction, a significant area of contact between the respective legs 22,24, 80,82 and the frame 46 is believed to provide a more stable station 10 than prior art designs.

The fillet nuts 128,136 can be precisely located relative to the legs especially the rear legs 22 by utilizing punch out portion of inner chamber member 116, illustrated as cutouts 220 in FIG. 4. Inner chamber member 116 provides tabs 222 when punching out cutouts 220 which can precisely hold a respective fillet nut 128 or others. This allows painting to be performed before installation of fillet nuts 128,130. The applicant attempted to install fillet nuts 128,130 before painting and the extra mass at those locations detrimentally affected the painting process. By being able to install the fillet nuts 128,130 precisely after painting, a satisfactory paint job was achieved while still maintaining the ability to precisely locate the fillet nuts 128,130, etc., in their desired locations. The fillet nuts 128,130,136 are preferably constructed of half round solid steel stock of a diameter similar to the diameter of the respective legs and allow for significant torques to be applied to the respective bolt 64 to provide a secure and tight contact for the saddles 142 to the respective leg constructions.

The rear legs 22 and 24 being made out of formed sheet steel instead of obround tubing is also believed to be an advantage. The cross-section of the construction of FIG. 16 is illustrated and clearly provides for an interior chamber 114 which can allow for the passage of respective conduits whether electrical or fluid related depending on respective rear leg 22,24. By providing access panels on an inner side of the respective legs, access can be relatively easy without a need to move tables when they are provided adjacent to one another to be able to access interior portions of the legs 22, 24. This is not possible with prior art designs. Precise tolerances can be maintained to support multifunctional features for connecting legs to other portions as well as for connections of shelvings as the connection points for accepting shelf brackets can be precisely located prior to bending the metal although some equipment now exists to allow the machining of this type construction with curved tubing as well. Cutouts can be provided in exterior portions of rear legs 22,24 as well, especially in embodiments like those of FIGS. 8 and 9.

As one can envision from the table top portion 164 with cutout 168 in FIG. 5, similar cutout construction was required with the prior art shelves. Shelves 182 are believed to be an improvement when utilizing brackets 178, 180 which provide for a cutout to accommodate the respective legs 22,20 and 24. Regular or rectangular shelves 182 etc., can be utilized which could not be utilized in prior art constructions of the GSR type.

This work station 10 is believed to be specifically adapted for use in laboratories. Other locations could have the station 10 utilized as well including, but limited to, classrooms, industrial applications, etc. The station 10 may include rear vibration dampening legs 22,24 extending downward for engagement with the floor and upwardly for vertical space and utility management. Interior rear leg portion is preferably multifunctional and provides height adjustment, work surface stability, vertical storage capability, support utility management, underlying structure for the attachment of various accessories.

This freestanding modular laboratory work station 10 is preferably compromised of modular components that can provide infrastructures to create and change work stations and open lab plans and other applications. Each workstation unit preferably provides an adjustable height work surface. With a full height leg units, the unit provides vertical storage as well as adjustable shelving and the utility management that can bring lab services to the work surface. The legs interface with the work service frame, preferably with heavy gauge steel sides and gussets can provide stable contact over a large area. The rear legs can provide advantages over prior art constructions.

Station 10 can provide for easy installation and removal of bookshelves, CRT stands, fans, task lamps, etc., to allow a worker to personalize his or her own work station. Additionally, and optionally, accessory panels can be mounted between the front and rear shelves for visual shielding and/or for such functional use as a marker board.

A raceway within the rear leg when interconnected with the horizontal raceway or channel provides fixed utility conduits for various lab services such as electricity, gas, etc. These raceways are preferably normally closed by access panels. The horizontal raceways and the electrical leg preferably define two separate channels for separation of low voltage data and telecommunications and high voltage power.

A utility distribution beam can be mounted between the uprights to serve as a structural beam to minimize lateral end and movement of the upper structure. This beam can not only provide structural aid but can also provide the ability to provide communication and power utilities.

The work surface frame 46 can be interconnected into a variety of configurations including various sizes of height. Successions of work surface plans may be interconnected as either add-on units or bridge units to provide an assembly of a number of desired work surfaces of any particular desired length or height. Modular construction can be supported by work surface frame and can be attached in ways to promote removal and to dampen vibration.

Countertops can be made of natural stone, synthetic stone-like material, ceramic, concrete, glasslike sheets, oglomerated stone, cement materials, metal, terrazo, etc., which can be impervious to moisture penetration, impact and scratching in some embodiments. The modular construction can, without limitations of many prior constructions, can be prefabricated through mass production methods and is relatively easy to assemble at a job site to eliminate much of on-site necessary to install work surfaces on fixed case work has been known in the past. This can reduce the cost of manufacturer installation such to ensure uniform fit and finish.

Figure 10:
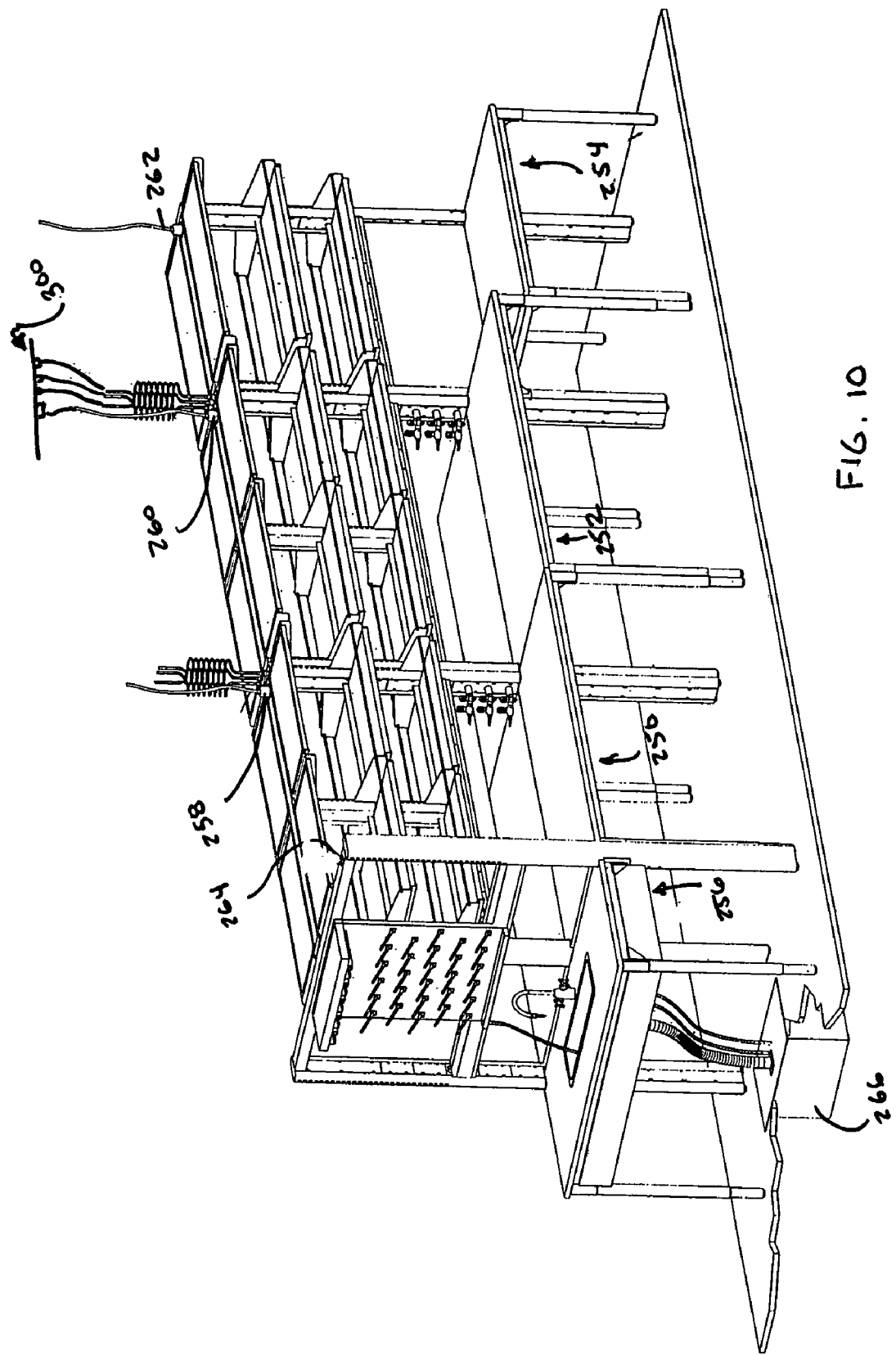
FIG. 10 is a front elevational view of a presently preferred embodiment of the present invention in a multiple configuration type scenario as could be found at a laboratory installation along with a floor box and a service column of the presently preferred embodiment.
Figure 11:
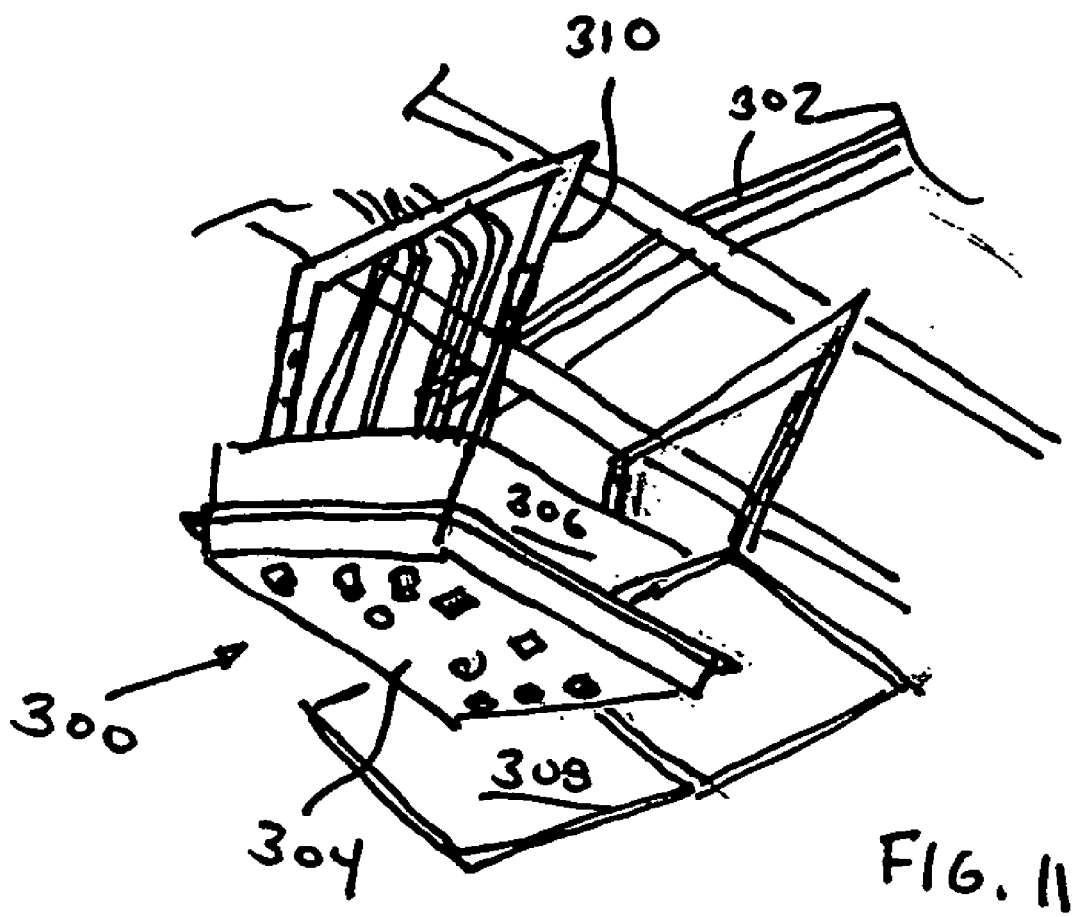
FIG. 11 shows a bottom perspective view of a service column connected to a ceiling structure above a portion of a dropped ceiling as is used in the presently preferred embodiment of the present invention with a portion of the dropped ceiling removed for clarity.

FIG. 10 shows a plurality of stations 10 or priority stations 250,252,254,256 in various configurations. Electricity is shown being provided to stations 250,252,254 from electrical conduits 258,260,262. Electricity could also be provided at connection 264. Various fluid connections are also provided as illustrated in accordance with the requested service. For work station 256 which is used as the end unit a floor box 266 is illustrated and will be described in more detail below. FIG. 10 is useful to show a layout which could be employed in a laboratory environment with multiple stations. Of course, various other layouts could also be provided in other embodiments.

Paragraph 11 shows a service column 300 connected to a ceiling such as flat rafters 302 having an access face 304 which extends down below a dropped ceiling when insides. Sides 306 to which dropped ceiling installers can match dropped ceiling tiles 308 as would be known by one of ordinary skill in the art also may be provided by the installer or the dropped ceiling installers. These services are preferably not only suspended by frame 310 which preferably has a height adjustment for the face 304 of service column 300 at least to a limited degree such as by having brackets which cooperate with a uni-strut frame as would be known by one of ordinary skill in the art within frame 310.

The connections on the face 304 preferably provide for various utilities such as various fluids possibly including water, gas, and air, as well as electrical connections whether for electrical applications or communications as well. By providing a service column 300 connected before installing a drop ceiling, significant savings such as over 15% can be achieved in the MEP cost (mechanical, electrical, plumbing, expertise costs and installation). In the prior art technique. one of the 2×2 panels was removed after installation of the drop ceiling and then their respective contractors would then mate up with a box connected to the drop ceiling. This is known to be quite difficult in some applications. The applicant's service column 300 is believed to be a huge improvement over prior art construction designs.

Figure 12:
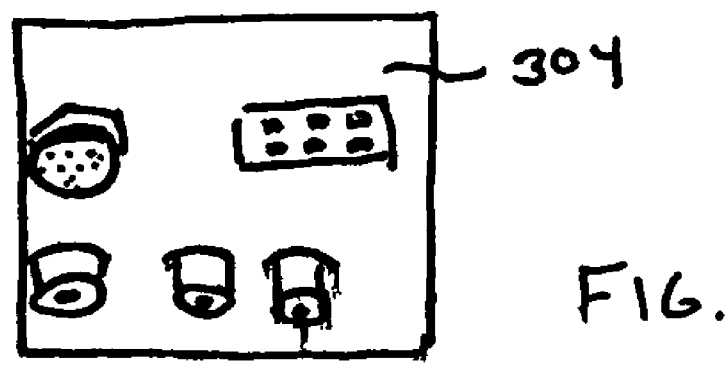
FIG. 12 shows a bottom plan view of the fitting of the service column shown in FIG. 11.

FIG. 12 shows a portion of face 304 with its various connections for plumbing and electrical support such as gas, water, electrical connections and communications connections. Of course, other connections as are known in the art could also be provided and other types of connections as are known in the art could also be provided in various other embodiments. At least a portion of the sides 306 of the column preferably extends a distance below the remainder of the drop ceiling tiles 308 as this provides a location for the ceiling tile frame members to be placed there against for ease of installation by a ceiling installer.

FIG. 13 shows a side view of a floor box 266 show in FIG. 10. Floor box 266 is believed to fill a need in the construction industry as well in that it preferably provides a metal shell 330 through which various conduits can be connected thereto such as hot water connection 332, cold water connection 334, and drain connection 336. These connections are preferably waterproofedly connected to the housing 330 so that there are no penetrations. Furthermore, the depth 338 of the box 226 is preferably deeper than concrete in which it might be installed. Connections 332, 334, 336 preferably located below a top level of the concrete. While the box 226 may be installed by the skilled trades, connections to connectors in the box need not be performed by skilled trades.

The ring coupler 340 is preferably an activated ball valve which would typically not allow any leakage when a drain is not connected to it. Shutoff valves 342 and 344 are also preferably provided internal to the floor box 266 so that when there are no utilities connected to it, it can be secured from use. The housing 330 preferably extends up to a top surface 346 which is preferably in the form of a flange that sticks out slightly above a surface of a flooring to which it is installed and a waterproof sealant 348 provided therebetween relative to a floor such as concrete floor 350 shown in FIG. 13. Conduits 352,354 and drain conduit 356 are illustrated as extending through a top plate 358 as will be discussed in further detail in reference to FIG. 15.

FIG. 14 shows a top view of the floor box 266 showing various connections such as water connections, low pressure gas and a possibility of other fluid connections such as air or other connections could be provided from the floor box 266 along with drain 336. A lower lip 360 preferably circumscribes the top surface 346 of the box which provides a lip for which the top plate 358 shown in FIG. 15 can rest.

The top plate 358 preferably has access panels 362,364, 366,368 and 370 with respective cutouts 372,374,376,378 and 380 which can be removed and/or moved when the desired service will be transferred from the floor box 266 to an appropriate location on a lab station or utilized in the preferred embodiment as shown or in other lab station. The floor box construction is believed to be novel over apparent designs in that it provides a way to easily access locations from a floor location which, once installed, does not necessarily require an MEP trade to then install the lab stations thereto. This is a way to provide even construction in that once the floor box 266 is installed a skill trade need not even be involved to actually connect the stations 10 to their respective fluid sources.

Figure 20:
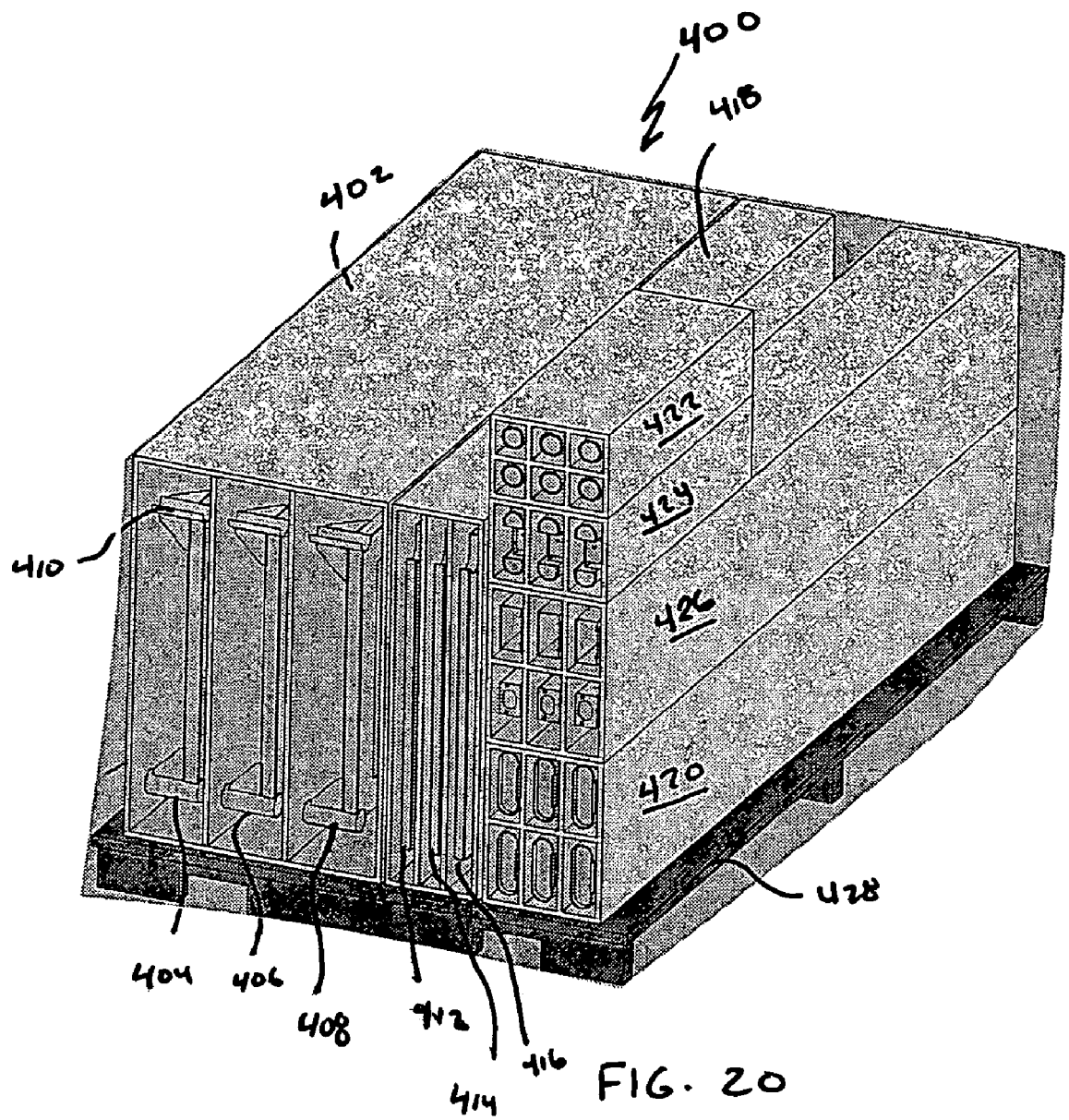
FIG. 20 shows a perspective view of three stations in a storage environment.

It is not uncommon for purchasers of laboratory stations to order spare stations including spare station parts. Storage of spare station parts has been found particularly difficult with prior art constructions. Accordingly, in an effort to provide an improved storage capability, storage configuration 400 as shown in FIG. 20 is preferably provided with the preferred embodiment for the extra parts and/or extra stations. Storage station 400 preferably includes first cabinet 402 which houses one or more frames 404,406,408. When made of the preferred construction, they can be the height of their respective saddles 410 and thus are easily stored in a relatively flat configuration. Tops 412,414,416 can be removed from the frames and stored in second storage container 418 which can have the same elevation as the first storage container 402. Rear legs, of which there are six, can be stored in third storage container 420. Front legs are illustrated as shown in fourth storage container 422, center supports are shown stored in fifth storage container 424. Finally, utility channels are shown stored in storage container 426. Although the shelves are not shown in the storage container, they could be similarly stored as could be the utility modules. Crate 428 is illustrated supporting the respective containers and provides a convenient way to support the respective components as can be seen from FIG. 20.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A laboratory station comprising:
   first and second rear legs having curved forward surfaces;

a first table top connected to rear saddles having curved surfaces spanning an arc and oriented rearwardly relative to the table top, said rear saddles extending forward of a rear edge of the table top;

fillet nuts connected to each of the first and second rear legs, said fillet nuts having a curved surface spanning an arc which cooperates with the arc of the rear saddles, said fillet nuts receiving threaded connector which extends through the saddles and distributes loads relative to the arcs of the fillet nuts and the arcs of the saddles to secure the table top relative to the rear legs; and first and second front legs which assist the first and second rear legs in supporting the first table top as a horizontal work surface.

2. The laboratory station of claim 1 wherein the curved surface of the fillet nut spans an arc of at least about 45 degrees.

3. The laboratory station of claim 2 wherein the curved surface of the fillet nut spans an arc of about 90 degrees.

4. The laboratory station of claim 1 further comprising front saddles connected to the first table top and front legs, said front legs receiving connectors extending from the front saddles to provide a connection thereto, said front saddles extending rearward of a front edge of the first table top.

5. The laboratory station of claim 4 wherein the front legs have fillet nuts connected thereto, said fillet nuts having a curved surface spanning an arc which cooperates with the arc of the front saddles, said fillet nuts receiving threaded connector which extends through the front saddles and distributes loads relative to the arcs of the fillet nuts and the arcs of the front saddles to secure the table top relative to the front legs.

6. The laboratory station of claim 5 wherein the fillet nuts have at least two bores therethrough and receive at least two threaded connectors at connections and at least one of the connections is located a distance above another.

7. The laboratory station of claim 1 further comprising multiple bores for receiving threaded connectors in the fillet nut located at multiple elevations.

8. The laboratory station of claim 7 wherein a height adjustment of the table top relative to the rear legs can be selected by a selection of which of the multiple bores are utilized for connection to the rear saddles with the threaded connectors.

9. The laboratory station of claim 1 further comprising a second table top extending parallel to the first table top and connected to at least one of the first and second rear legs.

10. The laboratory station of claim 9 wherein the second table top extends rearwardly of the first table top and meets intermediate front and rear portions of the rear legs.

11. The laboratory station of claim 9 further comprising a second saddle and an extension with the extension connected to at least one of the rear saddles and the second saddle so that when installed, the first and second table tops are at least substantially planar.

12. The laboratory station of claim 11 wherein the second saddle is connected to the fillet nut of the rear leg to which it is connected.

13. The laboratory station of claim 1 wherein the first table top has a rearmost extending portion which terminates intermediate front and rear portions of the rear legs.

14. The laboratory station of claim 13 further comprising a second table top connected to the rear legs which extends rearwardly relative to the first table top.

15. The laboratory station of claim 13 further comprising a backsplash which has an extension which extends parallel to the first table top and terminates at a perpendicularly extending wall at a rear of the rear legs.

16. The laboratory station of claim 1 wherein the rear legs are obround in circumference.

17. The laboratory station of claim 1 wherein the rear legs have an internal channel.

18. The laboratory station of claim 17 wherein at least a portion of the internal channel is punched out to provide retaining mechanism for the fillet nut.

19. The laboratory station of claim 17 wherein the internal channel of the rear legs is a C-channel and removable access panels are disposed inwardly of the rear legs.

20. A laboratory station comprising:

first and second rear legs having curved forward surfaces;

a table top connected to rear saddles having curved surfaces spanning an arc and extending rearwardly relative to the table top, said table top terminating at a rearmost portion intermediate front and rear portions of the first and second rear legs with the rear saddles extending forwardly of the rearmost portion of the table top;

nuts connected to each of the first and second rear legs, said nuts receiving threaded connector which extends through the saddles to secure the table top relative to the rear legs;

first and second front legs which assist the first and second rear legs in supporting the first table top as a horizontal work surface; and a backsplash having an extension which extends parallel to the table top and terminates at a wall, said wall extending along the rear portion of the first and second rear legs.

* * * * *